United States Patent
Mason, Jr. et al.

(10) Patent No.: US 6,678,137 B1
(45) Date of Patent: Jan. 13, 2004

(54) TEMPERATURE COMPENSATION CIRCUIT FOR AN ARC FAULT CURRENT INTERRUPTING CIRCUIT BREAKER

(75) Inventors: Henry H. Mason, Jr., Farmington, CT (US); Douglas B. Tilghman, Marlton, NJ (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 09/635,033

(22) Filed: Aug. 4, 2000

(51) Int. Cl.$^7$ ............................................. H02H 5/04
(52) U.S. Cl. ................................................ 361/103
(58) Field of Search .................................. 361/103, 105

(56) References Cited

U.S. PATENT DOCUMENTS

| | | | |
|---|---|---|---|
| 3,401,363 A | 9/1968 | Vyskocil et al. | 335/17 |
| 3,443,258 A | 5/1969 | Dunham et al. | 337/79 |
| 3,596,218 A | 7/1971 | Layton | 335/17 |
| 3,596,219 A | 7/1971 | Erickson | 335/17 |
| 4,208,690 A | 6/1980 | McGinnis et al. | 361/48 |
| 4,345,288 A | 8/1982 | Kampf et al. | 361/31 |
| 4,466,071 A | 8/1984 | Russell, Jr. | 364/492 |
| 4,513,268 A | 4/1985 | Seymour et al. | 335/35 |
| 4,513,342 A | 4/1985 | Rocha | 361/94 |
| 4,552,018 A | 11/1985 | Legatti et al. | 73/431 |
| 4,573,259 A | 3/1986 | Seymour et al. | 29/602 R |
| 4,589,052 A | 5/1986 | Dougherty | 361/94 |
| 4,598,183 A | 7/1986 | Gardner et al. | 200/50 A |
| 4,636,910 A * | 1/1987 | Chadwick | 361/103 |
| 4,641,216 A | 2/1987 | Morris et al. | 361/45 |
| 4,641,217 A | 2/1987 | Morris et al. | 361/45 |
| 4,658,322 A | 4/1987 | Rivera | 361/37 |
| 4,667,263 A | 5/1987 | Morris et al. | 361/42 |
| 4,672,501 A | 6/1987 | Bilac et al. | 361/96 |
| 4,686,600 A | 8/1987 | Morris et al. | 361/42 |
| 4,688,134 A | 8/1987 | Freeman et al. | 361/45 |
| 4,702,002 A | 10/1987 | Morris et al. | 29/837 |
| 4,847,850 A | 7/1989 | Kafka et al. | 372/71 |
| 4,878,143 A | 10/1989 | Kalal et al. | 361/94 |
| 4,878,144 A | 10/1989 | Nebon | 361/96 |
| 4,931,894 A | 6/1990 | Legatti | 361/45 |
| 4,936,894 A | 6/1990 | Larson et al. | 70/298 |
| 5,089,796 A | 2/1992 | Glennon et al. | 335/172 |
| 5,121,282 A | 6/1992 | White | 361/42 |
| 5,166,887 A * | 11/1992 | Farrington et al. | 361/94 |
| 5,185,684 A | 2/1993 | Beihoff et al. | 361/45 |
| 5,185,685 A | 2/1993 | Tennies et al. | 361/45 |

(List continued on next page.)

FOREIGN PATENT DOCUMENTS

| | | |
|---|---|---|
| CA | 2036032 | 8/1991 |
| WO | WO 91/13454 | 9/1991 |
| WO | WO 95/20235 | 7/1995 |

*Primary Examiner*—Edward H. Tso
*Assistant Examiner*—Pia Tibbits
(74) *Attorney, Agent, or Firm*—Cantor Colburn lLP (57) ABSTRACT

An arc fault current interrupting (AFCI) circuit breaker includes a pair of electrical contacts for stopping the flow of electrical current in a protected portion of the distribution circuit. A low pass filter is configured to receive a signal indicative of a voltage across a resistance in the distribution circuit. The low pass filter amplifies the signal and provides the signal to an arc fault detection circuit. The low pass filter includes an input resistance and a feedback resistance. In one embodiment of the invention, the input resistance has a positive temperature coefficient. In another embodiment, the feedback resistance has a negative temperature coefficient. In yet another embodiment, the input resistance has a positive temperature coefficient and the feedback resistance has a negative temperature coefficient. In any of the embodiments, when temperature decreases, the gain provided by the temperature compensation circuit increases due to the temperature coefficients of the input and/or feedback resistors. As a result, the arc fault detection circuitry will maintain a constant sensitivity to arc faults throughout the entire operating temperature range of the AFCI circuit breaker.

25 Claims, 5 Drawing Sheets

U.S. PATENT DOCUMENTS

| | | | |
|---|---|---|---|
| 5,185,686 A | 2/1993 | Hansen et al. | 361/45 |
| 5,185,687 A | 2/1993 | Beihoff et al. | 361/45 |
| 5,206,596 A | 4/1993 | Beihoff et al. | 324/536 |
| 5,208,542 A | 5/1993 | Tennies et al. | 324/544 |
| 5,223,682 A | 6/1993 | Pham et al. | 200/148 R |
| 5,224,006 A | 6/1993 | MacKenzie et al. | 361/45 |
| 5,229,730 A | 7/1993 | Legatti et al. | 335/18 |
| 5,245,302 A | 9/1993 | Brune et al. | 335/35 |
| 5,245,498 A | 9/1993 | Uchida et al. | 361/47 |
| 5,250,918 A | 10/1993 | Edds et al. | 335/35 |
| 5,299,730 A | 4/1994 | Pasch et al. | 228/180.22 |
| 5,303,113 A | 4/1994 | Goleman et al. | 361/93 |
| 5,307,230 A | 4/1994 | MacKenzie | 361/96 |
| 5,359,293 A | 10/1994 | Boksiner et al. | 324/544 |
| 5,418,463 A | 5/1995 | Fleming et al. | 324/520 |
| 5,420,740 A | 5/1995 | MacKenzie et al. | 361/45 |
| 5,432,455 A | 7/1995 | Blades | 324/536 |
| 5,434,509 A | 7/1995 | Blades | 324/536 |
| 5,452,223 A | 9/1995 | Zuercher et al. | 364/483 |
| 5,453,723 A | 9/1995 | Fello et al. | 335/18 |
| 5,459,630 A | 10/1995 | MacKenzie et al. | 361/45 |
| 5,475,609 A | 12/1995 | Apothaker | 364/492 |
| 5,483,211 A | 1/1996 | Carrodus et al. | 335/18 |
| 5,485,093 A | 1/1996 | Russell et al. | 324/522 |
| 5,493,278 A | 2/1996 | MacKenzie et al. | 340/638 |
| 5,506,789 A | 4/1996 | Russell et al. | 364/492 |
| 5,510,946 A | 4/1996 | Franklin | 361/56 |
| 5,510,949 A | 4/1996 | Innes | 361/93 |
| 5,512,832 A | 4/1996 | Russell et al. | 324/522 |
| 5,519,561 A | 5/1996 | Mrenna et al. | 361/105 |
| 5,546,266 A | 8/1996 | MacKenzie et al. | 361/93 |
| 5,550,751 A | 8/1996 | Russell | 364/492 |
| 5,561,605 A | 10/1996 | Zuercher et al. | 364/483 |
| 5,578,931 A | 11/1996 | Russell et al. | 324/536 |
| 5,583,732 A | 12/1996 | Seymour et al. | 361/93 |
| 5,590,012 A | 12/1996 | Dollar, II | 361/113 |
| 5,600,526 A | 2/1997 | Russell et al. | 361/65 |
| 5,614,878 A | 3/1997 | Patrick et al. | 335/14 |
| 5,615,075 A | 3/1997 | Kim | 361/87 |
| 5,629,824 A | 5/1997 | Rankin et al. | 361/57 |
| 5,659,453 A | 8/1997 | Russell et al. | 361/93 |
| 5,694,101 A | 12/1997 | Lavelle et al. | 335/172 |
| 5,706,154 A | 1/1998 | Seymour | 361/42 |
| 5,774,319 A * | 6/1998 | Carter et al. | 361/100 |
| 5,805,397 A * | 9/1998 | MacKenzie | 361/42 |
| 5,818,671 A | 10/1998 | Seymour et al. | 361/42 |
| 5,831,500 A | 11/1998 | Turner et al. | 335/17 |
| 5,939,991 A * | 8/1999 | Deng | 340/368 |
| 5,940,256 A * | 8/1999 | Mackenzie et al. | 361/93.6 |
| 6,057,997 A * | 5/2000 | Mackenzie et al. | 361/42 |
| 6,128,169 A * | 10/2000 | Neiger et al. | 361/42 |
| 6,259,340 B1 * | 7/2001 | Fuhr et al. | 335/18 |
| 6,331,763 B1 * | 12/2001 | Thomas et al. | 320/136 |
| 6,477,021 B1 * | 11/2002 | Haun et al. | 361/42 |

* cited by examiner

TEMPERATURE COMPENSATION CIRCUIT FOR AN ARC FAULT CURRENT INTERRUPTING CIRCUIT BREAKER

BACKGROUND OF THE INVENTION

The present invention generally relates to arc fault current interrupting (AFCI) circuit breakers. More specifically, the present invention relates to a temperature compensation circuit for an AFCI breaker.

AFCI circuit breakers are well known. These breakers comprise contacts that open upon sensing arcing from line to ground, or from line to neutral. Arc fault current breakers typically use a differential transformer to measure arcing from line to ground. Detecting arcing from line to neutral is accomplished by detecting rapid changes in load current by measuring voltage drop across a relatively constant resistance, usually a bi-metallic strip within the circuit breaker. Tripping of the AFCI breaker occurs when a predetermined number of arcs above a certain current level are detected within a predetermined time.

One characteristic of the bimetal element found in an AFCI breaker is that its resistance decreases as the ambient temperature decreases. It can be appreciated that the effect of the above characteristic is that the voltage developed across the bimetal element decreases with temperature for a given current. Typically, the electronic sensing circuitry in an arc fault current interrupting (AFCI) breaker is designed to have a fixed gain within a range of operating temperatures. Because the gain is fixed, low current arcs measured at low temperatures will develop a voltage that is interpreted to be below a certain threshold and will not be counted as "arcs". In other words, because the bimetal element caused a loss of gain as a result of temperature characteristics, the arcs or voltage developed across the bimetal element is made insufficient to count as an "arc". The result is that the number "arcs", or the number of voltages that are below a predetermined current threshold are reduced along with the sensitivity of the AFCI breaker to the occurrence of arc faults.

Schemes for an increase in overall gain are known. This approach typically solves problems related to inadequate gain at low temperatures. However, nuisance tripping is increased at room and higher temperatures. To offset the increased gain and prevent nuisance tripping, changes to decrease the response to low frequencies can be made. Arc faults typically cause a signal that is high frequency in nature, whereas noise is typically low frequency in nature. This approach works to reduce nuisance tripping, however, arc faults can cause a signal that has a low frequency. Therefore, changes to decrease the response to low frequencies can reduce the sensitivity of the circuit breaker to some arc faults. In sum, a trade off between gain, frequency response, and temperature is difficult to make.

BRIEF SUMMERY OF THE INVENTION

In an embodiment of the present invention, a temperature compensation circuit is used for an arc fault current interrupting circuit breaker. The arc fault current interrupting circuit breaker is configured to stop a flow of electrical current to a portion of an electrical distribution circuit. The temperature compensation circuit includes a low pass filter configured to receive a signal indicative of a voltage in the electrical distribution circuit. The low pass filter includes an input resistance configured to receive the signal. The input resistance has a positive temperature coefficient. The low pass filter also includes an operational amplifier having a first input and an output, the first input is electrically connected to the input resistance. A feedback resistance is electrically connected to the first input and to an output of the operational amplifier, and a feedback capacitance electrically connected to the first input and to an output of the operational amplifier.

In an alternative embodiment, the feedback resistance has a negative temperature coefficient. In yet another embodiment, both the input resistance has a positive temperature coefficient, and the feedback resistance has a negative temperature coefficient.

BRIEF DESCRIPTION OF THE DRAWINGS

The present invention will now be described, by way of an example, with references to the accompanying drawings, in which.

DETAILED DESCRIPTION OF THE INVENTION

Figure 1:
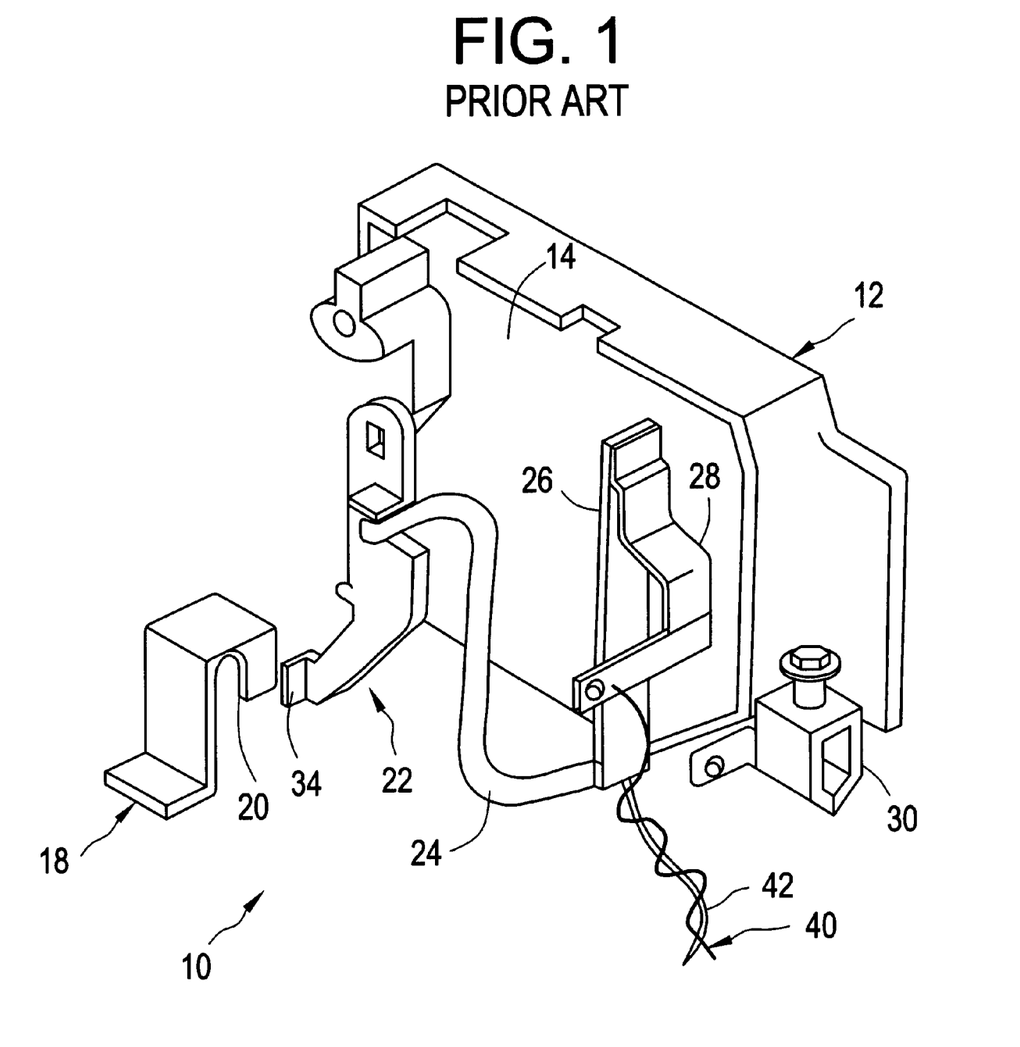
FIG. 1 is a perspective view of a mechanical compartment of an AFCI breaker including a temperature compensating circuit of the present invention.
Figure 2:
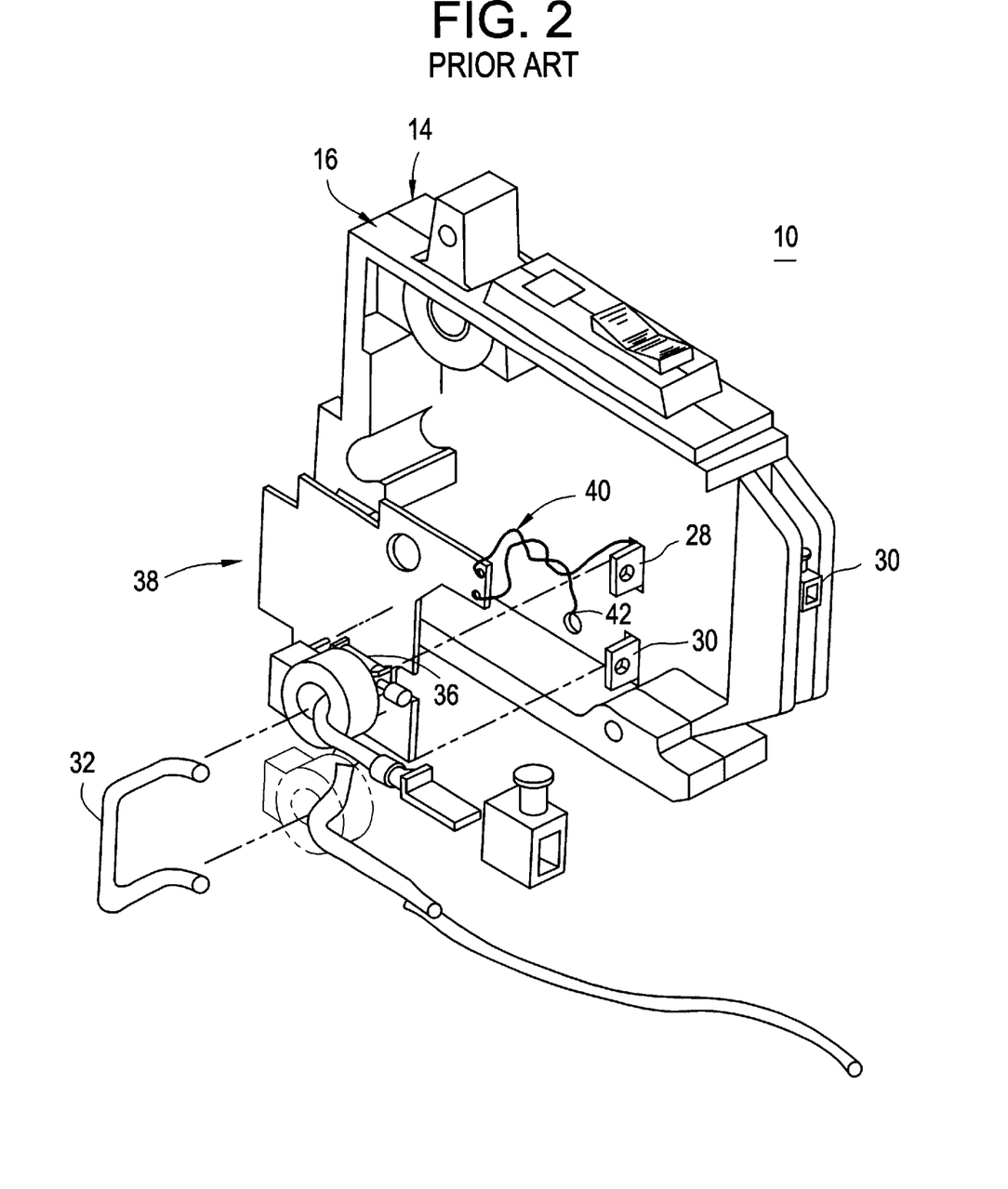
FIG. 2 is a perspective view of an electrical compartment of an AFCI breaker including a temperature compensating circuit of the present invention.

Referring to FIGS. 1 and 2, an arc fault current breaker 10 including a temperature compensation circuit of the present invention is shown. Circuit breaker 10 includes a housing 12 with a mechanical compartment 14 and an electronics compartment 16 formed therein. Within the mechanical compartment 14, a line strap 18 is electrically connected to an electrical distribution circuit (not shown). A stationary contact 20 is fixed to the end of the line strap 18. Rotatably secured within the mechanical compartment 14 is a movable contact arm 22. The movable contact arm 22 is electrically connected to a flexible conductor 24, which is electrically connected to one end of a bimetallic strip 26. The opposite end of the bi-metallic strip 26 is electrically connected to a load strap 28, which is electrically connected to a protected portion of the electrical distribution circuit (not shown) via load lug 30 and jumper 32. Attached to the end of movable contact arm 22 is a movable contact 34. During quiescent operation of the circuit breaker 10, the fixed and movable contacts 20 and 34 are in contact with each other, allowing the flow of electrical current from the distribution circuit through the line strap 18, fixed contact 20, movable contact 34, contact arm 22, flexible connector 24, bimetallic strip 26, load strap 28, jumper 32, and load lug 30 to the protected portion of the distribution circuit.

Certain overcurrent conditions in the electrical distribution circuit will cause the bimetallic strip 26 to heat up. At a predetermined temperature, the bimetallic strip 26 bends, contacting a release latch (not shown) in an operating mechanism (not shown) connected to the movable contact arm 22. When contacted by the bimetallic strip 26, the release latch trips the operating mechanism, which rotates the contact arm 22 to separate the stationary and movable contacts 20 and 34. Separation of the stationary and movable contacts 20 and 34 stops the flow of electrical current to the protected portion of the distribution circuit.

Within the electronics compartment 16 of the circuit breaker housing 12, a trip mechanism 36, such as a solenoid, is arranged to interact with the release latch of the operating mechanism (not shown). Also secured within the electronics compartment 16 is a circuit board 38, which includes arc fault detection circuitry, as is known in the art, and the temperature compensation circuitry of the present invention, as is described in further detail hereinafter. Extending from the circuit board 38 are two wires 40 and 42. Wire 42 extends into the mechanical compartment 14 and is electrically connected to one end of the bimetallic strip 26. Wire 40 is electrically connected to the opposite end of the bimetallic strip 26 via load strap 28.

The electrical resistance of the bimetallic strip 26 causes a voltage differential across wires 40 and 42 when current is passed through the bimetallic strip 26 (i.e. when contacts 20 and 34 are closed). The voltage differential is sensed by the arc fault detection circuitry on circuit board 38. If the voltage differential is indicative of an arc fault, the arc fault detection circuitry provides a trip signal to the solenoid 36. In response to the trip signal, the solenoid 36 trips the operating mechanism causing the contacts 20 and 34 to separate.

Figure 3:
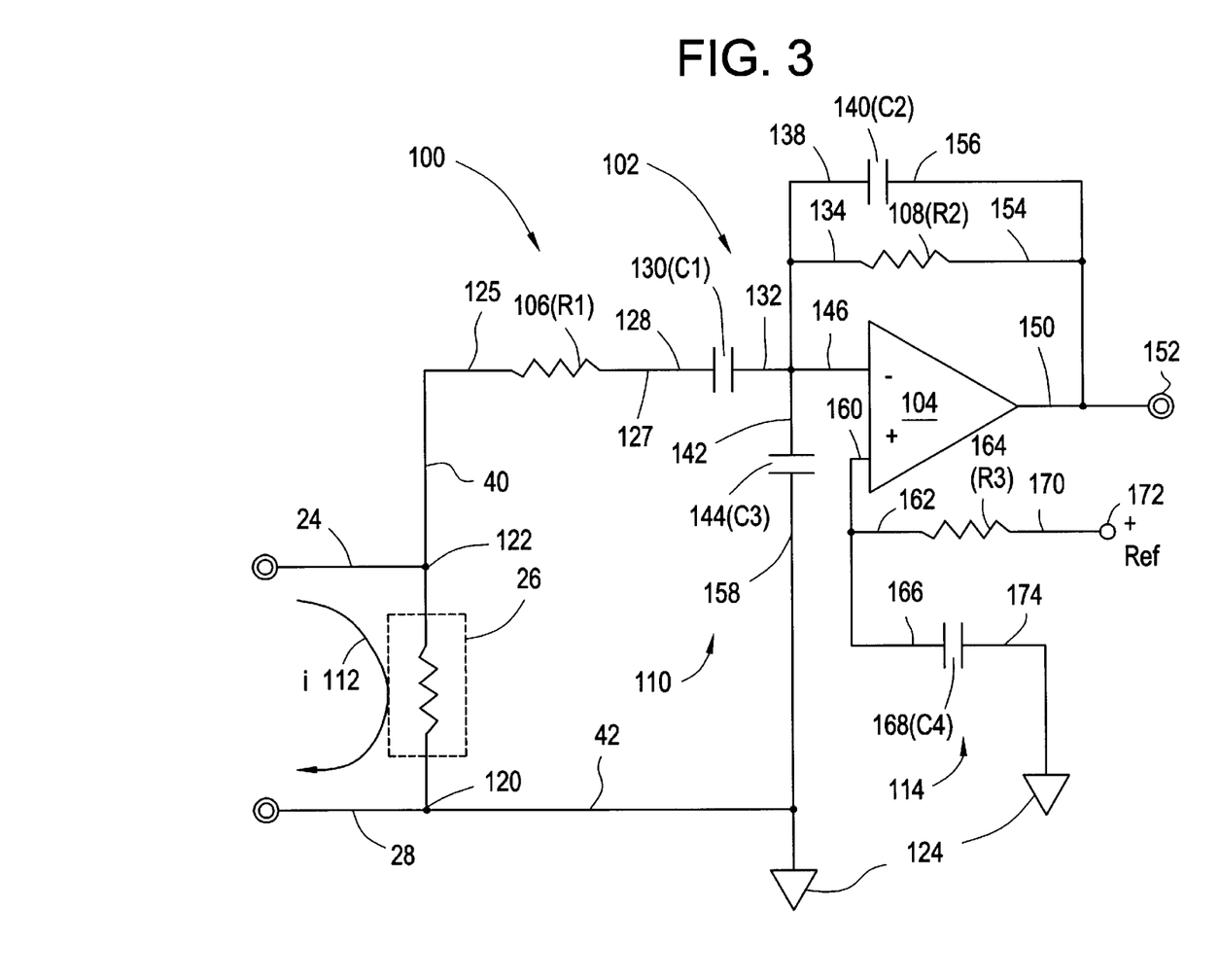
FIG. 3 is a temperature compensating circuit of the present invention.

Referring to FIG. 3, the temperature compensating circuit is shown generally at 100. Temperature compensating circuit 100 includes a low pass filter 102 comprising an operational amplifier (OP-AMP) 104, feedback capacitance 140 (C2) and resistances 106 (R1) and 108 (R2). An input filter 110 filters the voltage input to the low pass filter 102, and the direct current (DC) offset of the input signal is removed by an input capacitance 130 (C1). The reference voltage to the low pass filter 102 is filtered by reference filter 114.

Bi-metal element 26 has two ends, a first end 120 and a second end 122. The first end 120 is coupled to ground 124 via wire 42. The second end 122 is coupled to a first end 125 of input resistance 106 (R1) via wire 40. A second end 127 of input resistance 106 (R1) is coupled to a first end 128 of input capacitance (C1) 130. The input capacitance 130 (C1) has a second end 132. The second end 132 of the input capacitance 130 (C1) is coupled to a first end 134 of feedback resistance 108 (R2). Furthermore, the second end 132 of the input capacitance 130 (C1) is coupled to a first end 138 of feedback capacitance (C2) 140. In addition, the second end 132 of the input capacitance 130 (C1) is coupled to a first end 142 of a filter capacitance (C3) 144. A second end 158 of the filter capacitance (C3) 144 is coupled to ground 124. Lastly, the second end 132 of the input capacitance 130 (C1) is coupled to the inverting input 146 of OP-AMP 104.

The output lead 150 of the OP-AMP 104 is coupled to an output lead 152 of the circuit 100. Output lead 152 provides a voltage signal to the arc fault detection circuit. Furthermore, the output lead 150 of the OP-AMP 104 is coupled to a second end 154 of the feedback resistance (R2) 108. In addition, output lead 150 of the OP-AMP 104 is coupled to a second end 156 of the feedback capacitance (C2) 140.

A non-inverting lead 160 of the OP-AMP 104 is coupled to a first end 162 of a reference voltage resistance 164 (R3). Furthermore, the non-inverting lead 160 of the OP-AMP 104 is coupled to a first end 166 of a capacitance 168 (C4). The resistance 164 (R3) has a second end 170 that is coupled to a reference voltage 172. In addition, the capacitance (C4) 168 has a second end 174 that is coupled to ground 124.

In operation, current i 112 flows from flexible conductor 24, with most of the current i 112 flowing through the bimetallic element 26 to the load strap 28. The current i 112 flowing through the bimetallic element 26 generates a voltage drop across the bimetallic element 26 because of the inherent resistance in bimetallic element 26. Input capacitance 130 (C1) eliminates any DC offset that exists in the voltage signal developed across the bimetal 26, and filter capacitance 144 (C3) removes high frequency voltage from the input signal. Second capacitance (C2) 140 provides high frequency negative feedback to OP-AMP 104. Capacitance 168 (C4) delays the reference voltage input to the OP-AMP 104 during power up.

As is known to a technician skilled in the art of electronics, the gain of the OP-AMP 104 is determined by the ratio R1/R2. As the value of R1 decreases or the value of R2 increases, the gain of the OP-AMP 104 will increase. In the temperature compensation circuit of the present invention, R1 is selected such that R1 has a positive temperature coefficient (PTC). In other words, resistance RI increases as temperature increases. Because of the PTC of R1, the gain of the OP-AMP 104 increases as ambient temperature within the AFCI breaker decreases. This increased gain will offset the decreased voltage developed across the bimetal 26, and the signal at the output lead 152 of the OP-AMP 104 will be the same for a given current through the bimetal across the operating temperature range of the AFCI breaker. As a result, an AFCI breaker including the temperature compensating circuit 100 of the present invention will maintain a constant sensitivity to arc faults across the operating temperature range of the AFCI breaker, as was previously unattainable with the constant-gain arc fault detection circuitry of the prior art. In addition, the temperature compensating circuit 100 of the present invention will avoid nuisance tripping and the loss of sensitivity to low frequency signals, as was found in the arc fault detection circuitry of the prior art.

In an alternative embodiment of the present invention, the value of the second resistance R2 is chosen such that the second resistance R2 has a negative temperature coefficient (NTC). In other words, resistance R2 decreases as temperature decreases. Thus, it can be appreciated that the gain of the OP-AMP 104, which is R1/R2, increases with decreasing temperature. In another alternative embodiment, the resistance of Ri has a PTC and the resistance of R2 has a NTC. In this embodiment, the total temperature compensation will be increased above what would be achieved by compensation with R1 or R2 alone.

Figure 4A:
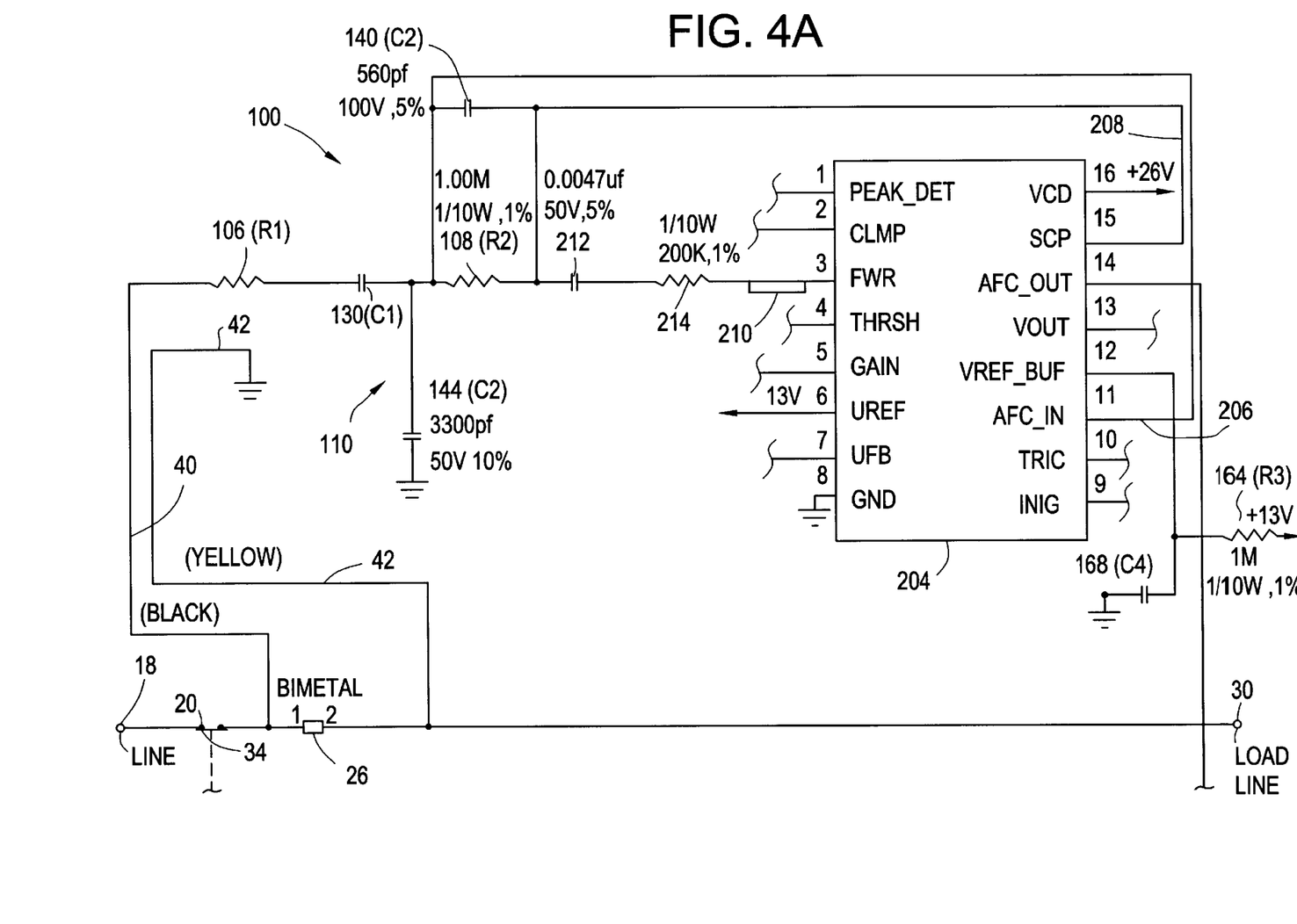
FIG. 4 is a schematic of an AFCI breaker fault detection circuit including the temperature compensating circuit of FIG. 2.
Figure 4B:
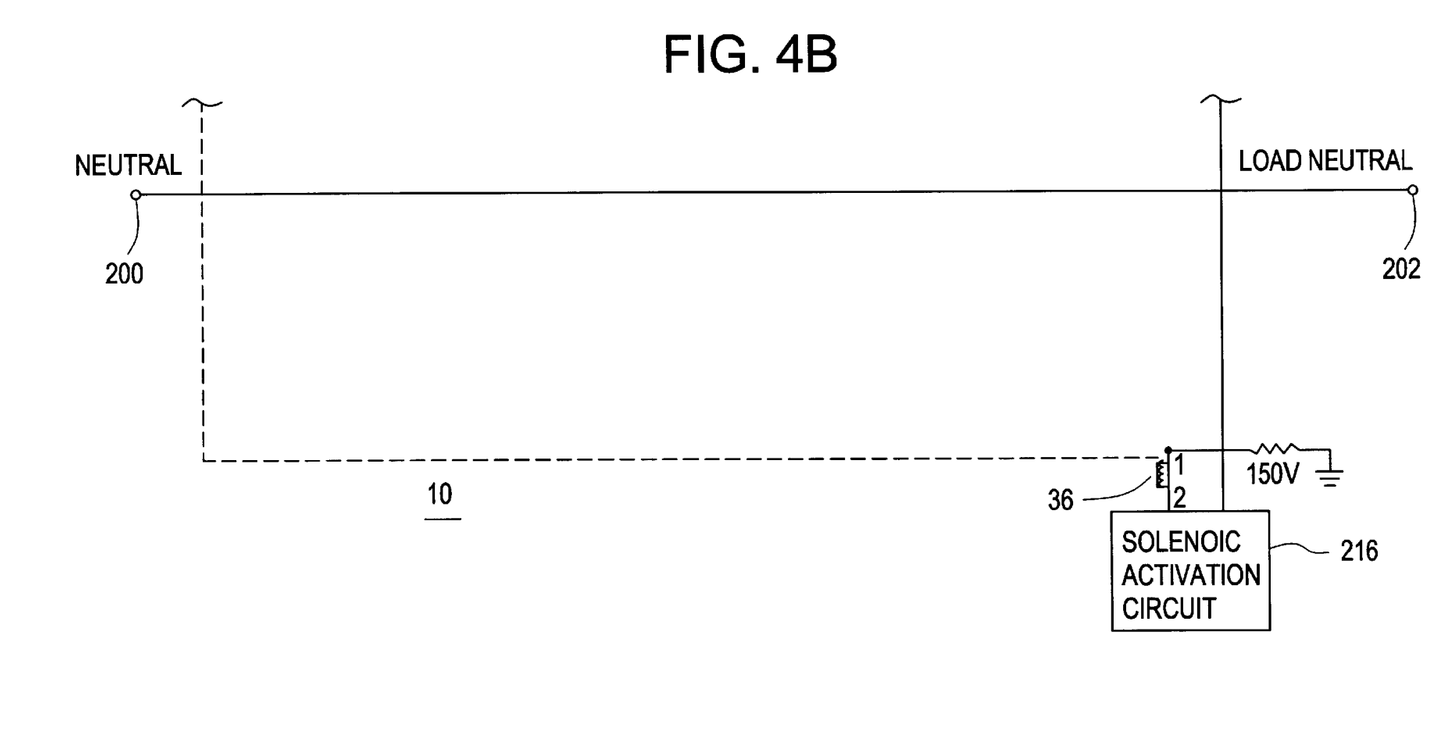

Referring now to FIG. 4, temperature compensation circuit 100 is shown along with earth leakage detection circuitry in AFCI breaker 10. Breaker 10 is electrically connected to an electrical distribution circuit via line strap 18 and load lug 30 and line-side and load-side neutral terminals 200, 202. Connected in series between line strap 18 and load lug 30 are contacts 20 and 34 and bimetallic element 26. Wire 40 is electrically connected to one side of bimetallic element 26, and wire 42 is electrically connected to the opposite side of bimetallic element 26. Temperature compensation circuit 100 is substantially similar to that shown in FIG. 3, with an application specific integrated circuit (ASIC) 204 containing the functions of OP-AMP 104 shown in FIG. 3. ASIC 204 also provides one or more commonly known arc fault detection algorithms.

During quiescent operation of the AFCI breaker 10, electrical voltage passes from line strap 18 to load lug 30 via contacts 20,34 and bimetallic element 26. The resistance of bimetallic element 26 creates a voltage differential across the wires 40 and 42. Wire 40 carries a voltage signal to input resistor 106 (R1) and then through input capacitor 130 (C1).

Input capacitor 130 (C1) removes any DC offset inherent in the voltage signal. The voltage signal is then filtered by input filter 110, comprising, for example, a 3300 pico-farad capacitor 144 (C2). Next, the voltage signal is received by an ASIC lead 206, which acts as the inverting input for the OP-AMP process. The amplified signal output from the OP-AMP process is provided to a lead 208 of ASIC 204 and to feedback capacitor 140 (C2) and feedback resistor (R2). Lead 208 provides the amplified signal to an ASIC lead 210, via a capacitor 212 and a resistor 214. The ASIC lead 210 acts as an input to the arc fault detection process of ASIC 204. Using the amplified signal received at lead 210, the arc fault detection process determines if the amplified signal indicates that an arc fault exists in the electrical distribution circuit by applying any known arc fault detection algorithm. If an arc fault is detected, the ASIC 204 provides a trip signal to the solenoid activation circuitry 216. In response to the trip signal, the solenoid activation circuitry 216 provides operating current to solenoid 36. On receipt of the current, the solenoid 36 separates electrical contacts 20 and 34 to stop the flow of electrical current to the protected portion of the electrical distribution circuit.

In the example shown in FIG. 4, resistor R1 has a positive temperature coefficient (PTC). Therefore, when temperature decreases, the gain provided by the temperature compensation circuit 100 increases. In other words, the amplified signal provided as input to the arc fault detection process of ASIC 204 is amplified more for colder temperatures than it is for hotter temperatures. As a result, the arc fault detection process of ASIC will maintain a constant sensitivity to arc faults throughout the entire operating temperature range of the AFCI breaker 10.

It will be understood that a person skilled in the art may make modifications to the preferred embodiment shown herein within the scope and intent of the claims. While the present invention has been described as carried out in a specific embodiment thereof, it is not intended to be limited thereby but intended to cover the invention broadly within the scope and spirit of the claims.

What is claimed is:

1. A method of detecting arc faults in a circuit breaker, the method comprising:
   sensing an electrical condition at a portion of an electrical distribution circuit to provide a signal indicative of the elecaical condition;
   adjusting the signal based on a temperature change related to the portion of the electrical distribution circuit to provide an adjusted signal; and
   detecting an arc fault in the electrical distribution circuit based on the adjusted signal.

2. The method of claim 1, wherein the adjusting includes: adjusting amplification of the signal in proportion to the temperature.

3. The method of claim 2, wherein the adjusting amplification includes:
   adjusting a feedback resistance of an amplifer.

4. The method of claim 3, wherein the feedback resistance has a negative temperature coefficient.

5. The method of claim 2, wherein the adjusting amplification includes:
   adjusting an input resistance to an amplifier.

6. The method of claim 5, wherein the input resistance has a positive temperature coefficient.

7. The method of claim 1, wherein die portion of the electrical distribution circuit includes a bimetallic element, and the electrical condition is a voltage across the bimetallic element.

8. A circuit breaker comprising:
   means for sensing an electrical condition at a portion of an electrical distribution circuit and providing a signal indicative of the electrical condition;
   means for adjusting the signal based on a temperature change related to the portion of the electrical distribution circuit and providing an adjusted signal; and means for detecting an arc fault in the electrical distribution circuit based on the adjusted signal.

9. The circuit breaker of claim 8, wherein the means for adjusting includes:
   means for adjusting amplification of the signal in proportion to the temperature change.

10. The circuit breaker of claim 9, wherein the means for adjusting amplification includes:
    means for adjusting a feedback resistance of an amplifier.

11. The circuit breaker of claim 10, wherein the feedback resistance has a negative temperature coefficient.

12. The circuit breaker of claim 9, wherein the means for adjusting amplification includes:
    means for adjusting an input resistance to an amplifier.

13. The circuit breaker of claim 12, wherein the input resistance has a positive temperature coefficient.

14. The circuit breaker of claim 8, wherein the portion of the electrical distribution circuit is a bimetallic element and the electrical condition is a voltage across the bimetallic element.

15. A circuit breaker comprising:
    a pair of electrical contacts;
    a resistance electrically coupled to one of the electrical contacts;
    a sensor operably coupled to the resistance and configured to sense an electrical condition at the resistance and provide a signal indicative of the electrical condition;
    a temperature compensation circuit electrically coupled to the sensor and configured to adjust the signal based on a temperature change related to the resistance and to provide an adjusted signal.

16. The circuit breaker of claim 15, wherein the temperature compensation circuit includes:
    an amplifier having an input resistance end a feedback resistance, at least one of the input resistance and the feedback resistance being selected to adjust a gain of the amplifier in proportion to the temperature.

17. The circuit breaker of claim 16, wherein the input resistance has a positive temperature coefficient.

18. The circuit breaker of claim 16, wherein the feedback resistance has a negative temperature coefficient.

19. The circuit breaker of claim 16, wherein the feedback resistance has a negative temperature coefficient and the input resistance has a positive temperature coefficient.

20. The circuit breaker of claim 15, wherein the temperature compensation circuit includes:
    a low pass filter including:
    an input resistance configured to receive the signal indicative of the electrical condition, the input resistance having a positive temperature coefficient,
    an operational amplifier having a first input and an output, the first input electrically coupled to the input resistance, a feedback resistance electrically coupled to the first input and to the output of the operational amplifier, and a feedback capacitance electrically coupled to the first input and to the output of the operational amplifier, wherein the positive temperature coefficient of the input resistance is selected to adjust a gain of the operational amplifier to at least partially compensate for a change related to the resistance in the electrical distribution circuit.

21. The circuit breaker of claim 20, wherein the feedback resistance has a negative temperature coefficient.

22. The circuit breaker of claim 20, further comprising:

an input capacitance electrically connected between the input resistance and the operational amplifier.

23. The circuit breaker of claim 20, further comprising:

an input filter electrically connected between the input resistance and the operational amplifier, the input filter configured to filter the signal.

24. The circuit breaker of claim 20, further comprising:

an input capacitance electrically connected between the input resistance and the operational amplifier; and an input filter electrically connected between the input capacitance and the operational amplifier.

25. The circuit breaker of claim 20, wherein the operational amplifier comprises an application specific integrated circuit.

* * * * *